United States Patent

Gonzaga

(10) Patent No.: US 6,823,922 B2
(45) Date of Patent: Nov. 30, 2004

(54) BEAD RELEASING AND REMOVING HEAD FOR A TIRE-FITTING MACHINE, FOR ASSEMBLING/DISASSEMBLING A TIRE

(75) Inventor: Tullio Gonzaga, Correggio (IT)

(73) Assignee: Butler Engineering & Marketing SRL (IT)

(*) Notice: Subject to any disclaimer, the term of this patent is extended or adjusted under 35 U.S.C. 154(b) by 0 days.

(21) Appl. No.: 10/298,835

(22) Filed: Nov. 18, 2002

(65) Prior Publication Data

US 2003/0094244 A1 May 22, 2003

(30) Foreign Application Priority Data

Nov. 22, 2001 (IT) .................................. VR2001A0124

(51) Int. Cl.[7] .......................................... B60C 25/132
(52) U.S. Cl. ........................................ 157/1.3; 157/1.17
(58) Field of Search .......................... 157/1.17, 1.22, 157/1.24, 1.3, 1.35, 1.46, 1.49, 11

(56) References Cited

U.S. PATENT DOCUMENTS

| | | | | |
|---|---|---|---|---|
| 1,728,159 A | * | 9/1929 | Farmer | 157/1.46 |
| 3,771,580 A | * | 11/1973 | Branick | 157/1.17 |
| 3,847,197 A | * | 11/1974 | Konen | 157/1.17 |
| 4,615,370 A | | 10/1986 | Cuccolini | |
| 4,787,433 A | * | 11/1988 | Thomas | 157/1.17 |
| 5,226,465 A | * | 7/1993 | Schon et al. | 157/1.24 |
| 6,408,921 B1 | * | 6/2002 | Bonacini | 157/1.24 |
| 6,619,362 B2 | * | 9/2003 | Corghi | 157/1.24 |

FOREIGN PATENT DOCUMENTS

JP          2001301432          4/2000

* cited by examiner

*Primary Examiner*—Hadi Shakeri
(74) *Attorney, Agent, or Firm*—Orum & Roth

(57) ABSTRACT

Bead releasing and removing head for a tire fitting machine comprising a support frame (2) anchored to the tire fitting machine and supporting at its top at least a bead releasing disk (3) and a bead removing tool (4), having a working tip (7), wherein the removing tool (4) is slidably supported by said head and comprises driving means (5) suitable for displacing it, upon control, so that the working tip (7) is movable between an advanced working position and a withdrawn rest position.

20 Claims, 6 Drawing Sheets

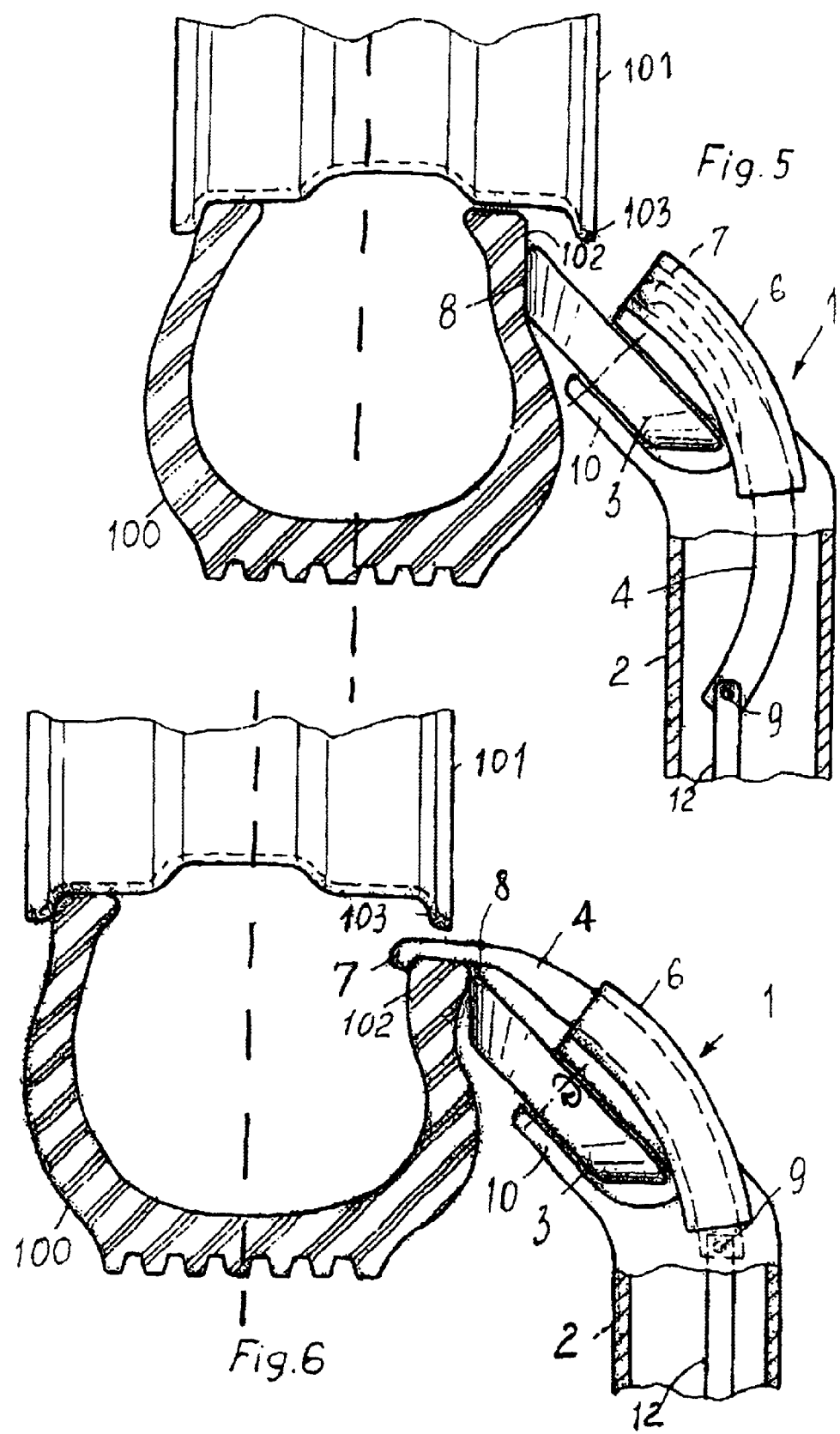

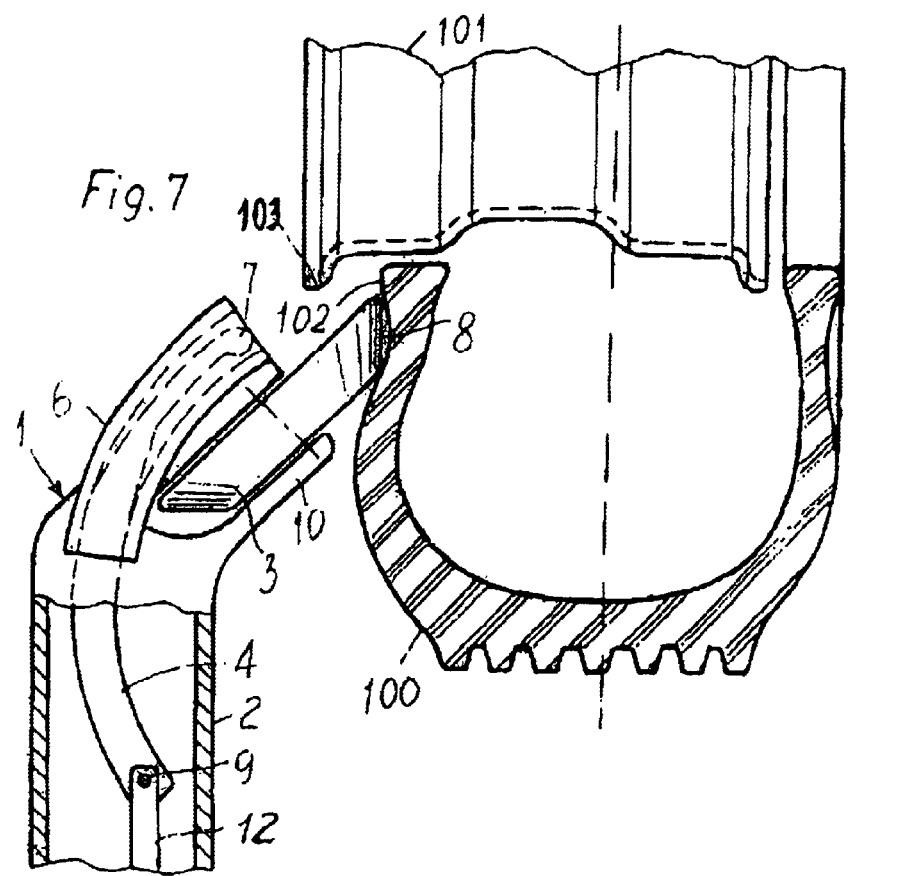
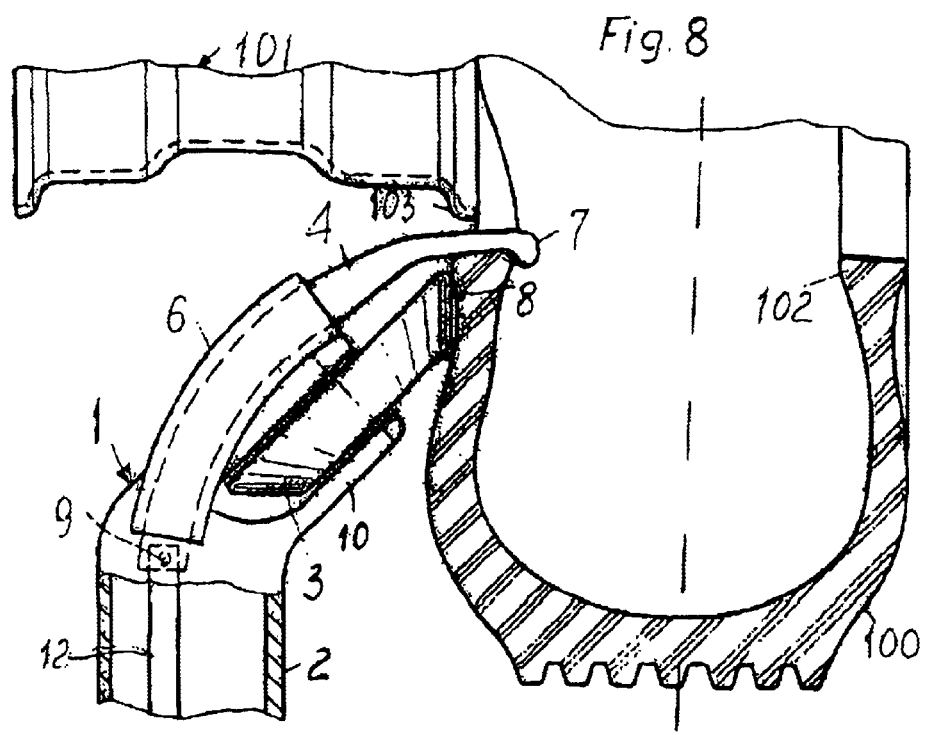

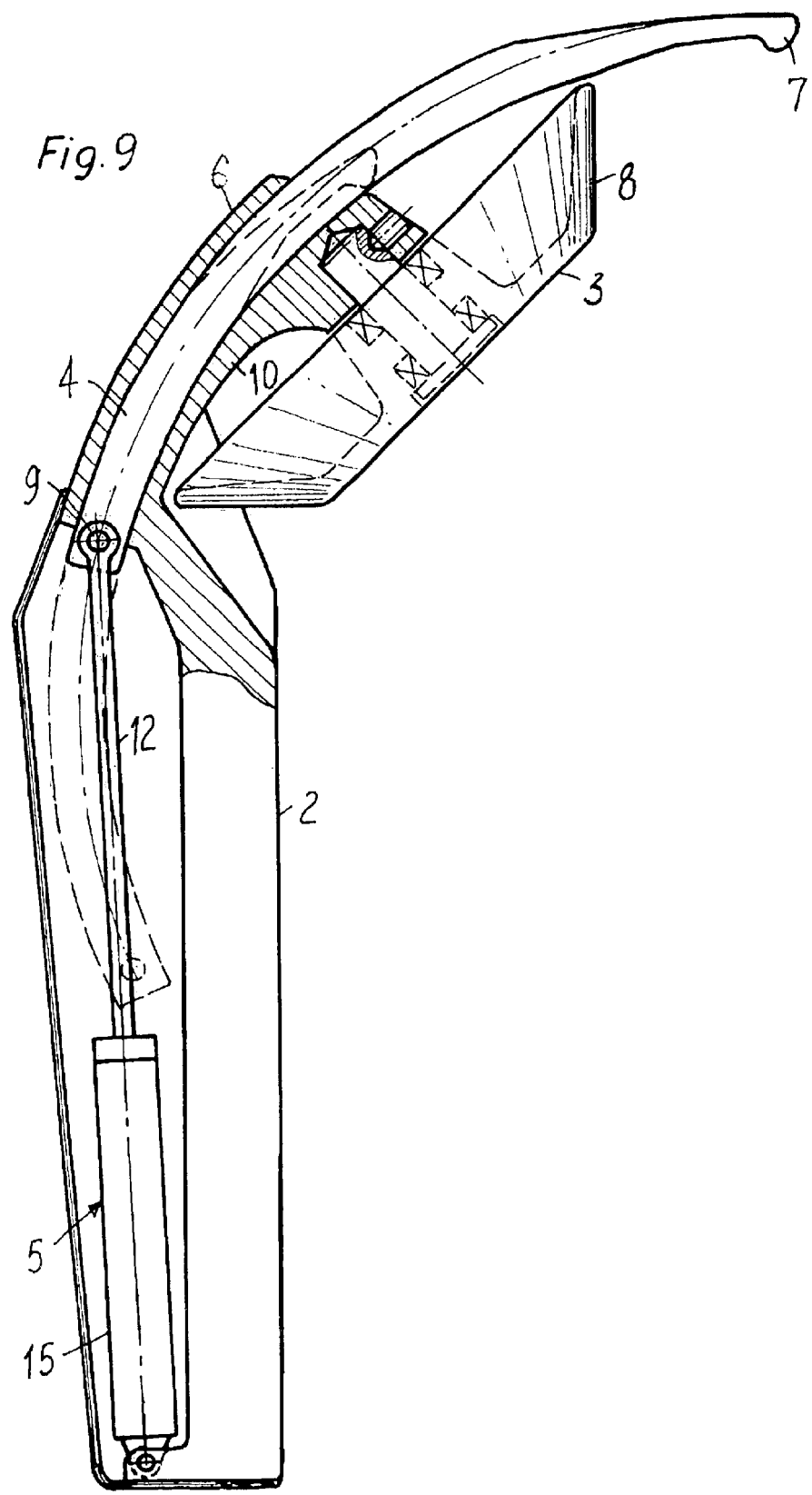

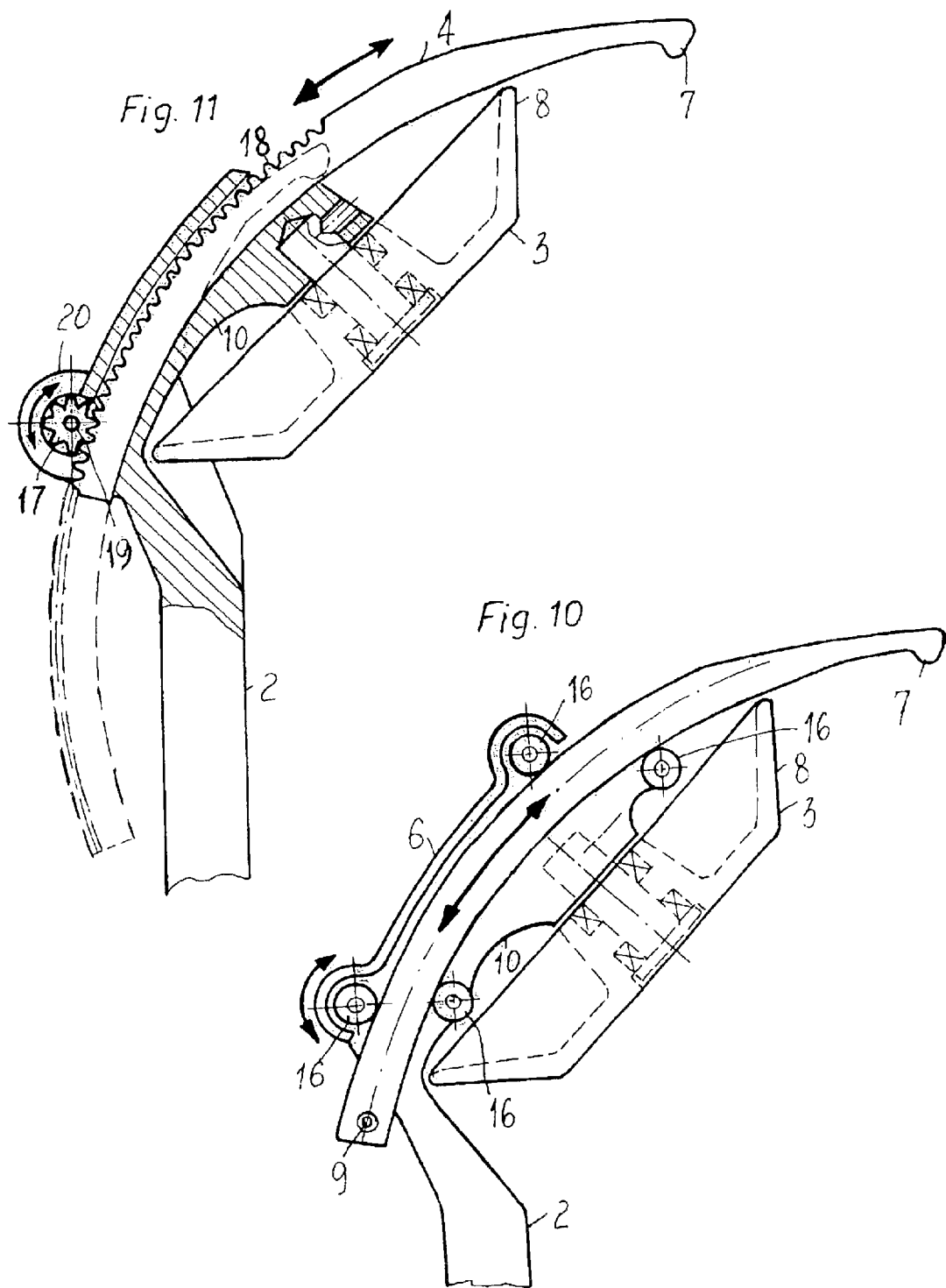

BEAD RELEASING AND REMOVING HEAD FOR A TIRE-FITTING MACHINE, FOR ASSEMBLING/DISASSEMBLING A TIRE

BACKGROUND OF THE INVENTION

The present invention relates to a bead releasing head provided with a bead removing tool for assembling/disassembling a tire, to be used on a tire-fitting machine, i.e. a tire assembling/disassembling machine.

As known, tire-fitting machines have a series of tools designed to carry out and assist in operations of tire fitting on, and disassembling from, wheel-rims.

For carrying out disassembling operations use is made of a bead releasing disk or roller designed to act on the tire-beads and of a removing lever or tool which is inserted between the tire bead and the edge of the wheel-rim, once the bead releasing operation has been completed both on the front side and on the back side of the tire, to cause the removal from the wheel-rim first of one side of the tire, and then of the other.

It has already been suggested to fit a bead releasing disk or roller D and a removing tool U on one head T mounted for rotation and lockable in position by means of a support arm or upright M, as shown in FIGS. 1 to 4 of the accompanying drawings which show a bifunctional tool-carrying head T of a known type, in the various bead releasing and removing stages both at the front and back side of a wheel-rim C for disassembling a tire P from its respective wheel-rim C.

The bead releasing disk D and tool U are arranged facing each other, whereby following a 180° rotation of the head T on its respective support arm or upright M, the disk D or the bead removing tool U can be brought to its working position, i.e. it can be oriented facing the tire P to be disassembled from its respective wheel-rim C.

In any case, the tool carrying heads T require that the operator carries out quite laborious positioning and setting manoeuvres that heavily slow down the working steps and entail a certain dexterity that is acquired only with adequate experience. After each operation, each tool D, U, at the operator's discretion, should be moved again to the rest position; in the real practice, however, such an operation is often ignored, and thus in the subsequent bead releasing operation it will be necessary for the operator to displace the tools to their correct position before being able to use them.

Moreover, after intervention of the bead releasing disk D that has thus urged the bead Pa of tire P inside an intermediate groove Ca in wheel-rim C through its active edge or front, within the same time interval in which one tool D, U is replaced by the other, i.e. to remove the bead releasing disk D and bring the removing tool U to its working position, bead Pa of removed tire P tends resiliently to return to its pre-release position, i.e. towards the outer edge Ce of the wheel-rim, thus at least partly obstructing the passage delimited by edge Ca and bead Pa under the action of the bead releasing disk D, thereby making the insertion of bead removing tool U much more difficult.

SUMMARY OF THE INVENTION

The main object of the present invention is to eliminate the above shortcomings of the state of the art by contriving a bead releasing head for tire assembling/disassembling machines that makes it possible to eliminate the need to put the head in position again after the operation of a tool, to have the possibility to use the other tool to release the beads and remove the tires from the their respective wheel-rims, thus making the bead releasing and removing operations simpler, swifter and more expeditious.

This and other objects that will be better apparent below are attained by a bead releasing and removing head according to the present invention for a tire assembling/disassembling machine, including an upright structure anchored to the said tire assembling/disassembling machine, a bead releasing disk and a bead removing tool having a work tip, both supported at the top of said upright structure, wherein the said bead removing tool is slidably supported by the said head on the same side and in the same direction as the said bead releasing disk and comprises driving means arranged to cause said bead removing tool to be displaced, upon control, between an outwardly extended working position and a withdrawn rest position, while sliding over and flash with said bead releasing disk along a curved path, thereby overtaking the said bead releasing disk to reach said extending working position.

BRIEF DESCRIPTION OF THE DRAWINGS

Further aspects and advantages of the present invention will be better apparent from the detailed description given below of a preferred not exclusive embodiment of a bead releasing and removing head for a tire disassembling machine shown by way of not limiting example in FIGS. 5 to 11 of the accompanying drawings, in which:

FIGS. 5 to 8 show the same bead releasing and removing steps of FIGS. 1 to 4 carried out by means of a bead releasing and removing head according to the present invention;

FIG. 9 shows a partly cut-away elevation side view on an enlarged scale of an alternative embodiment of the bead releasing and removing head shown in FIGS. 5 to 8; and FIGS. 10 and 11 show partly cut-away elevation side views on an enlarged scale of two further alternative embodiments of a bead releasing and removing head according to the present invention.

DESCRIPTION OF THE PREFERRED EMBODIMENTS

Figure 1:
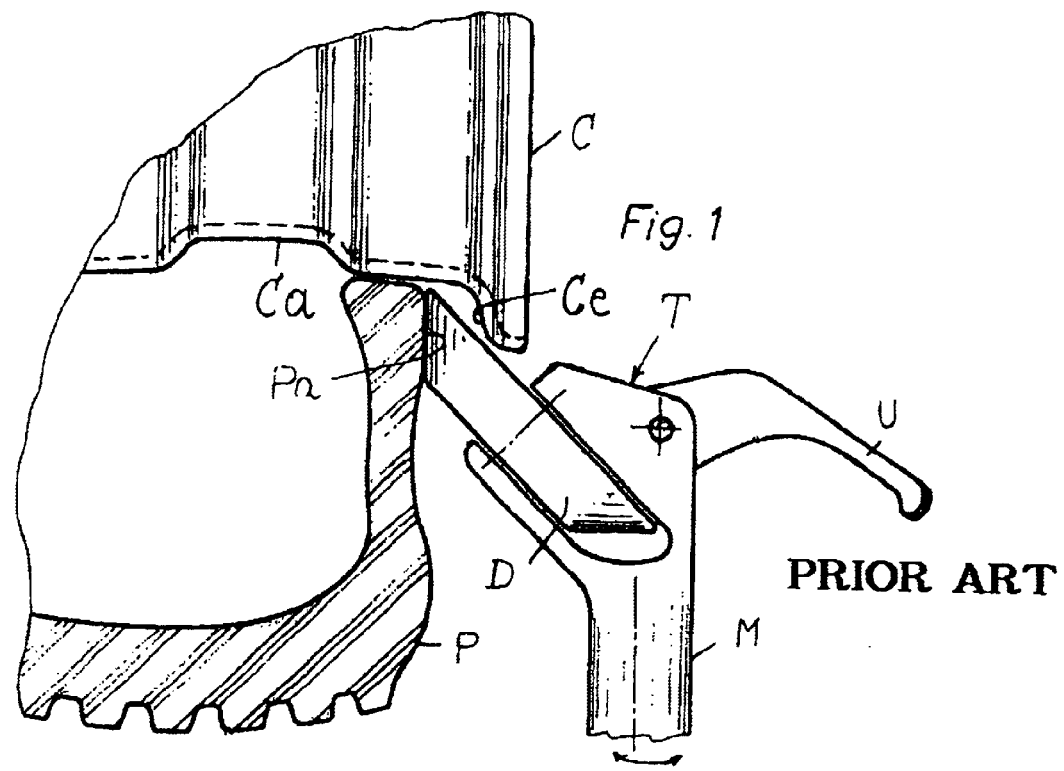
FIGS. 1–4 show a prior art bead releasing and removing method.
Figure 2:
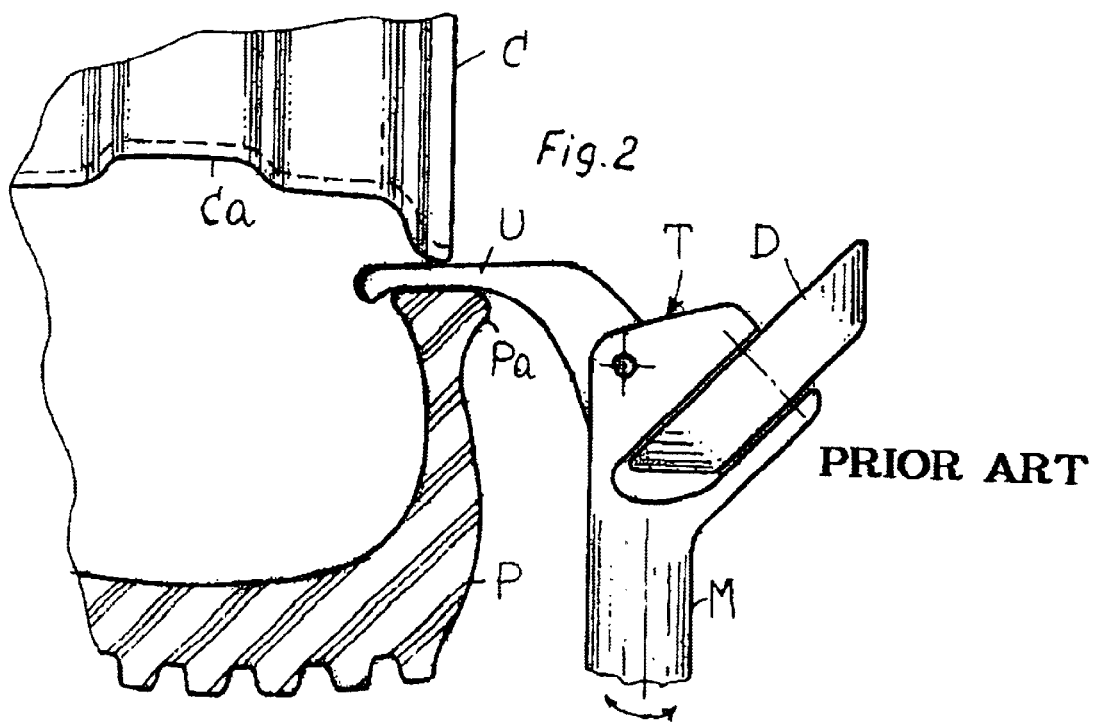
Figure 3:
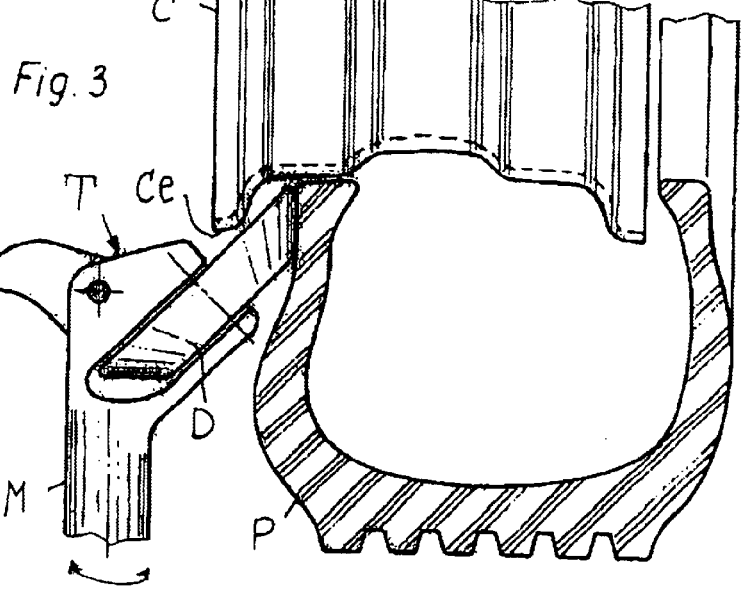
Figure 4:
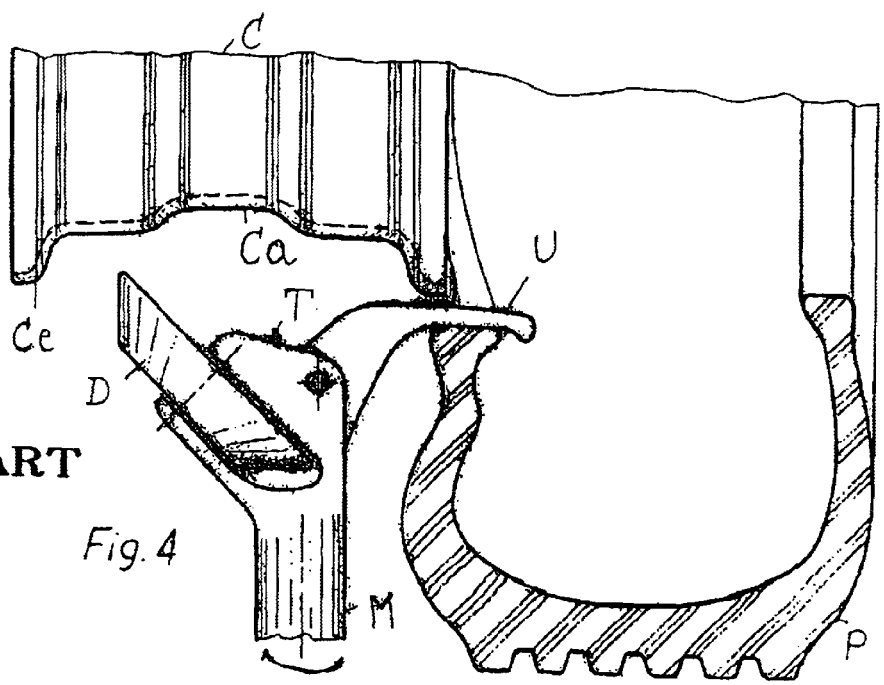

With specific reference to FIGS. 5 to 9, reference numeral 1 generally designates a bi-functional bead releasing and removing head for a tire fitting-disassembling machine, not shown in the drawings. Head 1 comprises a support upright 2 which, for instance, protrudes from the frame of the tire fitting-disassembly machine on which head 1 is to be fitted, a bead releasing disk 3, preferably frusto-conical in shape, and a removing tool 4.

Bead releasing tool 4 is slidably, e.g. telescopically, mounted in a tubular seat 6 provided at the top of upright 2, so as to be displaceable between a working position, in which it extends outwards from its respective seat 6 (FIGS. 6 and 8), and a rest position in which it is withdrawn in it (FIGS. 5 and 7).

In its working position, the bead releasing tool 4 has its work end or tip 7 facing towards the head portion of the working front 8 of the frusto-conical bead releasing disk 3 so as to extend above the disk 3 when it is moved to its working position, preferably substantially on a diametrically opposite vertical plane of disk 3 to such an extent as to protrude well beyond the distal work edge or front 8 thereof.

More particularly, bead releasing tool 4 is usually curved in shape, and thus even the tubular seat 6 is correspondingly curved to act as an optimal support and guide means for the bead releasing tool.

The upright 2 is provided at the top thereof with an appendix or arm 10 that extends therefrom at an angle with respect to the upright 2. Bead releasing disk 3 is idly rotatably mounted on the arm 10 on an axis of rotation perpendicular to arm 10. Thus, the axis of rotation of bead releasing disk 3 is inclined at predetermined angles with respect of both the upright 2 and the axis of a wheel-rim 101 fitted with a tire 100 against which disk 3 is designed to act.

FIGS. 5 and 6 show the working steps (bead release and bead removal) carried out by the bead releasing disk 3 and the bead removing tool 4, respectively, on one side of tire 100, whereas FIGS. 7 and 8 illustrate the same working steps at the other side of the same tire, after the tool carrying head 1 has been rotated once through 180° about its own (vertical) axis.

As better visible in FIG. 9 that illustrates a head 1 with some constructional modifications with respect to the head illustrated in FIGS. 5 to 9, at its end opposite to the working end 7 bead removing tool 4 is articulated at 9 to the end of a piston rod 12 of a fluid operated jack, e.g. a pneumatic double-action jack 5, whose cylinder 15 is articulated to the upright 2. Jack 5 is designed to actuate bead removing tool 4, i.e. to displace it, upon control, to its working position, or to withdraw it inside its support and guide seat 6.

In the embodiment shown in FIG. 9, the arm 10 at the top of the upright 2 is arranged adjacent to the tubular seat 6 of removing tool 4, rather than away from it, as shown in FIGS. 5 to 8.

In an alternative embodiment, the tubular guiding seat 6 comprises (as shown in FIG. 10) two pairs of rollers 16 rotatably mounted on the side opposite to the bead removing tool 4 so as to guide it while the same is being displaced between its working position and its rest position, as explained above.

The driving means for the bead removing tool 4 can be of any suitable type. Thus, e.g. they comprise a pinion or spool 17, and a rack 18 (as shown in FIG. 11). Rack 18 is preferably formed in a section of the outer backside of the bead removing tool 4 (usually convex in shape), whereas pinion 17 is keyed on the output shaft 19 of a motor 20 (e.g. an electric motor) supported by the upright 2.

The operation of a bead releasing and removing head according to the present invention is the following: when an operator proceeds with disassembling a tire 100 from a wheel-rim 101, he secures the wheel-rim to a rotary support flange or platform of a tire fitting machine and deflates tire 100. Then he moves the upright 2 closer to the tire so that the working edge 8 of the tire releasing disk 3 contacts the bead 102 of the tire 100. At that stage the bead removing tool 4 is kept withdrawn within its seat 6.

Then the operator sets in rotation the rotary platform of the tire fitting machine, and thus the wheel-rim 101 and tire 100 therewith, whilst the upright 2 is urged towards the wheel-rim. The urging action exerted by the upright 2, thus by the bead releasing disk 3, causes a progressive release of the bead 102 along the whole circular edge 103 of wheel-rim 101, while pushing the tire bead towards a central groove 104 of the wheel-rim 101.

Once the bead has been fully released, the bead removing tool 4 is extracted by causing it to slide out from its seat 6, or to slide between rods 12, by energizing the linear activator 5, or by starting motor 20 that causes pinion 17 in meshing engagement with rack 18 to rotate.

The extraction of bead removing tool 4 occurs in the same direction and on the same side of the active front 8 of the bead releasing disk 3 that is held in an urging condition against bead 102, while sliding over and flush with it along a curved path so as to overtake it and move the working end 7 beyond the active front 8 to such an extent as to be inserted between the edge 103 of the wheel-rim 101 and the bead 102 of the tire 100 to engage the inner side of the bead.

Once the bead removing tool has been fully inserted underneath the tire bead, the operator causes the upright 2 to be moved away from the wheel-rim 101 while setting the flange of the tire fitting machine in rotation at the same time, so as to separate the active front 8 of the bead releasing disk 3 from the tire 100, whilst also slightly withdrawing bead removing tool 4 that can thus progressively remove the bead from wheel-rim 101 to disassemble it therefrom—see FIG. 6.

The same sequence of operations is also carried out by the operator on the opposite side of the tire 100, e.g. after the wheel-rim 101 lying on the rotating platform of the tire fitting machine has been turned over, or else after the upright 2 has been displaced and head 1 rotated on its own axis through 180°, and repeating the working sequence described above.

The invention as described above is susceptible to numerous modifications and variations within the scope of the claims.

Thus, the bead releasing and removing head was described with particular reference to disassembling operations of a tire from a wheel-rim. It should be understood, however, that, as a person skilled in the art is well aware, by acting in reverse, the assembling of a tire onto the respective wheel-rim can also be carried out in an expedite and accurate manner.

What is claimed is:

1. A bead releasing and removing head for a tire assembling/disassembling machine, including an upright structure anchored to said tire assembling/disassembling machine, a bead releasing disk and a bead removing tool having a work tip, both supported at a top of said upright structure, wherein the said bead removing tool is slidably supported by said head on the same side and in the same direction as said bead releasing disk and comprises driving means arranged to cause said bead removing tool to be displaced, upon control, between an outwardly extended working position and a withdrawn rest position, while sliding over and flush with said bead releasing disk along a curved path, thereby overtaking said bead releasing disk to reach said extended working position.

2. A bead releasing and removing head according to claim 1, wherein the said removing tool is provided with sliding supporting and guiding means.

3. A bead releasing and removing head according to claim 2, wherein said support and guide means comprises a curved tubular seat on said support structure.

4. A bead releasing and removing head according to claim 2, wherein said support and guide means comprises at least two pairs of rollers idly mounted on said support structure.

5. A bead releasing and removing head according to claim 1, wherein said driving means of said bead removing tool comprises at least one linear actuator carried by said support structure and in operational engagement with said removing tool.

6. A bead releasing and removing head according to claim 1, wherein said driving means of said bead removing tool comprises a rack formed in a section of said removing tool, a pinion in meshing engagement with said rack and a motor for said pinion.

7. A bead releasing and removing head according to claim 1, wherein said bead removing tool is curved in shape.

8. A bead releasing and removing head according to claim 1 rotatably mounted about an axis of rotation on said support structure to be rotatable through 180 degrees.

9. A bead releasing and removing head for a tire assembling/disassembling machine, including an upright structure anchored to said tire assembling/disassembling machine, a bead releasing disk and a bead removing tool having a work tip, both supported at a top of said upright structure, wherein said bead removing tool is slidably supported by said head and comprises driving means arranged to cause said bead removing tool to be displaced, upon control, whereby the worktip is moveable between an outwardly extended working position and a withdrawn rest position, wherein said removing tool is provided with sliding supporting and guiding means and said supporting and guiding means comprise at least two pairs of rollers idly mounted on said support structure.

10. A bead releasing and removing head according to claim 9, wherein said bead removing tool is on the same side and in the same direction as said bead releasing disk, while sliding over and flash with the bead releasing disk along a curved path, thereby overtaking said bead releasing disk to reach the extended working position.

11. A bead releasing and removing head according to claim 9, wherein said driving means of said bead removing tool comprises at least one linear actuator carried by said support structure and in operational engagement with said removing tool.

12. A bead releasing and removing head according to claim 9, wherein said driving means of said bead removing tool comprises a rack formed in a section of said removing tool, a pinion in meshing engagement with said rack and a motor for said pinion.

13. A bead releasing and removing head according to claim 9, wherein said bead removing tool is curved in shape.

14. A bead releasing and removing head according to claim 9 rotatably mounted about an axis of rotation on said support structure to be rotatable through 180 degrees.

15. A bead releasing and removing head for a tire assembling/disassembling machine, including an upright structure anchored to said tire assembling/disassembling machine, a bead releasing disk and a bead removing tool having a work tip, both supported at a top of said upright structure, wherein said bead removing tool is slidably supported by said head and comprises driving means arranged to cause said bead removing tool to be displaced, upon control, whereby the worktip is moveable between an outwardly extended working position and a withdrawn rest position, wherein said driving means of said bead removing tool comprises a rack formed in a section of said removing tool, a pinion in meshing engagement with said rack and a motor for said pinion.

16. A bead releasing and removing head according to claim 15, wherein said bead removing tool is on the same side and in the same direction as said bead releasing disk, while sliding over and flush with the bead releasing disk along a curved path, thereby overtaking said bead releasing disk to reach the extended working position.

17. A bead releasing and removing head according to claim 15, wherein said removing tool is provided with sliding supporting and guiding means.

18. A bead releasing and removing head according to claim 17, wherein said support and guide means comprises a curved tubular seat on said support structure.

19. A bead releasing and removing head according to claim 15, wherein said driving means of said bead removing tool comprises at least one linear actuator carried by said support structure and in operational engagement with said removing tool.

20. A bead releasing and removing head according to claim 15, wherein said bead removing tool is curved in shape.

* * * * *